March 7, 1967  L. A. LUEDTKE  3,307,680
BALE THROWING MECHANISM
Filed Feb. 10, 1964  2 Sheets-Sheet 1

INVENTOR.
LLOYD A. LUEDTKE
BY
Wheeler, Wheeler & Wheeler
ATTORNEYS

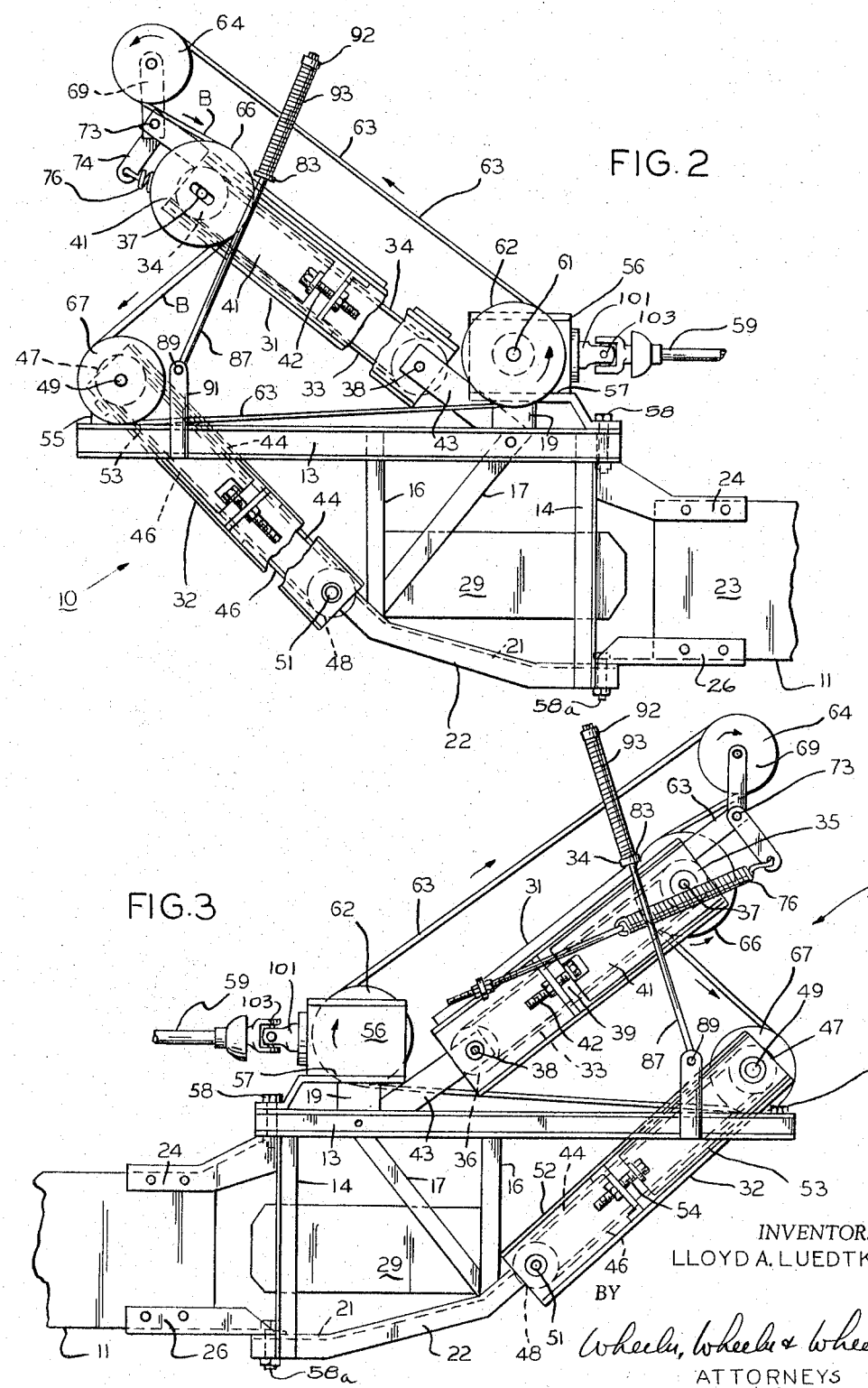

ated Mar. 7, 1967

3,307,680
BALE THROWING MECHANISM
Lloyd A. Luedtke, P.O. Box 123, Allenton, Wis. 53002
Filed Feb. 10, 1964, Ser. No. 343,698
7 Claims. (Cl. 198—128)

This invention relates to bale throwing devices, particularly to a bale throwing device having endless belt-type bale accelerating and throwing conveyers driven by a single endless strand co-operating with drive and slack take-up pulleys mounted at the discharge end of such conveyers.

One of the principal objects of the invention is to provide a bale throwing mechanism having means adapted for connecting the bale throwing mechanism to a support, such as a baler, for pivotal movement relative to the baler and for providing a simple arrangement for transmitting power from the baler to the bale thrower notwithstanding relative pivotal movement therebetween. In the specifically disclosed construction, this means comprises a universal coupling connecting a pair of rotatable shafts which are respectively fixed to the baler and to the bale thrower, the coupling being in general alignment to the axis of pivotal movement between the baler and the bale thrower.

Another of the principal objects of this invention is to provide a bale throwing mechanism that will accept a moving bale and accelerate the same to a speed where the bale can be ejected some distance from the mechanism as on to a farm wagon or the like.

Another object is to provide in the said endless bale moving conveyer a first endless conveyer including a frame supporting an endless belt or the like reeved between space pulleys at the end of the frame thereof, and a second endless conveyer similar to the first one, but being movable relative to the first conveyer, both of the conveyers being characterized by an endless driving strand trained about driving and slack take-up pulleys mounted at the discharge end of such conveyers to maintain the conveying reaches thereof free from slack at all times.

Still another object is to provide in the mechanism of the general kind described, an idler pulley mounted at the discharge end of the movable one of the said two conveyers, such idler pulley providing the endless driving strand with proper tension at all times at the driving pulleys of the two conveyers.

Other objects and important features of the invention will be apparent from a study of the following specification taken with the drawings, which together describe and illustrate a preferred embodiment of the invention, and what is now considered to be the best mode of practicing the principles thereof.

In the drawings:

FIGURE 2 is a side view thereof; and

FIGURE 3 is an opposite side view thereof.

Figure 1:
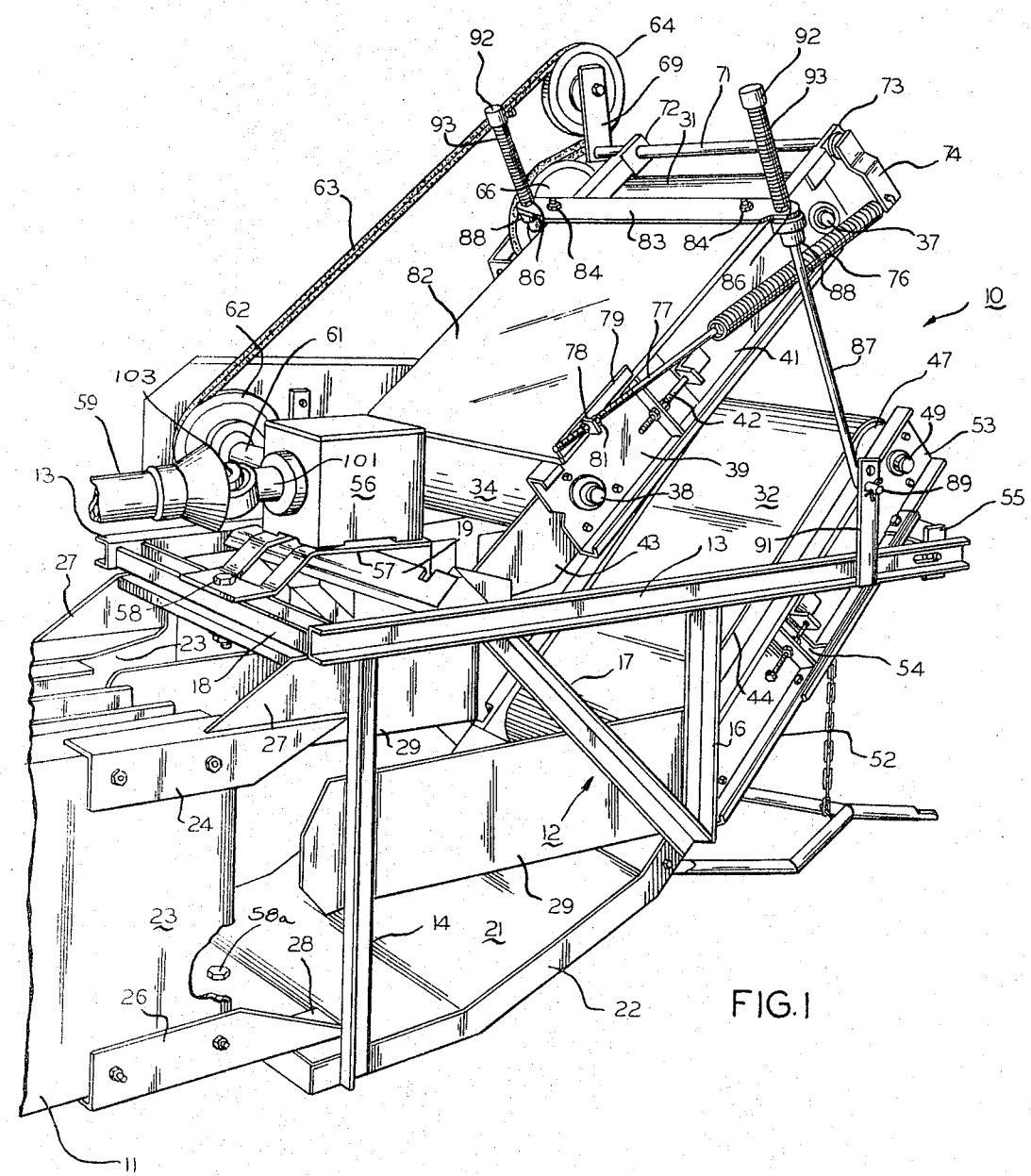
FIGURE 1 is a partially broken away perspective view of a bale throwing mechanism having the improvements according to the present invention embodied therein.

Referring now particularly to FIGURE 1 of the drawings, the improved throwing mechanism according to the present invention is referred to generally by the reference numeral 10, and is shown as an attachment at the discharge end of a bale forming apparatus indicated generally by the reference numeral 11. As seen in FIGURE 1, the bale throwing mechanism 10 consists of a pair of laterally spaced frames 12 each consisting of an upper chord member 13, vertical web members 14 and 16 secured thereto, and a diagonal bracing member 17. The upper chord members 13 are maintained in spaced apart relationship by means of beam members 18 and 19, beam member 18 being welded at its ends to the chord member 13, and beam member 19 being welded at its ends to the upper ends of the diagonal bracing member 17.

The frame 12 supports a bale receiving plate or chute 21 having down-turned sides 22 secured by welding to the lower ends of the frame members 14, 16, and 17. The vertical frame members 14 and 16 and the diagonal bracing members 17 have side plates 29 welded thereto for guiding the bales as they move on to the chute 21.

The frame is secured to the discharge end of the baling apparatus 11, the baling apparatus having spaced side frames 23 defining a discharge chute adapted to deliver the finished bales on to the receiving chute 21. Secured to the side frames 23 forming the discharge chute for the bale forming mechanism 11 are laterally spaced pairs of upper and lower angle members 24 and 26, respectively. The upper angle members 24 are joined by a gusset plate 27 and the lower angle members 26 are joined by a strip or horizontal leg 28.

The bale thrower includes means for pivotally carrying the thrower from a support, such as a baler. In the disclosed construction, the thrower is pivotally connected to the baler by means of a bolt 58 interconnecting the beam member 18 and the gusset plate 27 and by means of a bolt 58a aligned with the bolt 58 and interconnecting the horizontal leg 28 and a reinforced adjacent edge margin of the bale receiving plate 21.

The bale throwing mechanism according to the present invention has an upper endless conveyer 31 and a lower endless conveyer 32. These conveyers are adapted to receive a moving bale between the opposed contiguous conveying reaches thereof, and to accelerate through bale throwing velocity at the discharge end thereof.

The upper endless conveyer 31 has a lower conveying reach 33 and an upper return reach 34, forming an endless conveyer belt which is reeved between spaced pulleys 35 and 36, pulleys 35 and 36 being respectively mounted on pulley shafts 37 and 38. The upper endless conveyer 31 includes spaced side frames 39, 39 in the form of a channel-shaped section, and an adjusting frame 41 is nested within the frame member 39 to adjust the tension on the upper endless conveyer belt. The telescoping adjustable conveyer frames 41, 41 support the pulley 35 and its shaft 37, and are adapted to be adjustably positioned by means of the adjusting device 42 seen in the several views. The two conveyer frames 39, 39 are swingably supported on bracket arms 43 extending upward from the upper chord member 13.

The lower conveyer 32 has an upper conveying reach 44 and a lower return reach 46. The two reaches are reeved between pulleys 47 and 48, these being respectively mounted upon pulley shafts 49 and 51. The lower conveyer 32 has spaced channel-shaped side frames 52, 52 and the adjustment of the tension of the reaches 44 and 46 is achieved by adjustable telescoping frame members 53 which are adjusted in their position with respect to the frame members 52 by adjusting devices 54. The two frame members 52, 52 are supported on the pulley shaft 51, which in turn is supported upon the lower side members 22.

The pitch of the conveyer 32 can be adjusted by means including respective releasable attachment of the frame members 53, 53 to vertically extending members 55 through respective vertical slot and bolt connections. In turn, the members 55 are attached to the chord members 13 by horizontally extending slot and bolt connections indicated at 55a.

The upper and lower endless conveyers 31 and 32 are driven through a speed reducer unit 56 mounted on a pedestal 57 overlying the cross member 19, pedestal 57 being welded to cross member 18. In accordance with the invention, this speed reducer 56 is driven from a power take-off source on the baling machine 11, through a rotatable power shaft in a manner still to be described. Speed reducer 56 has an output drive shaft 61 having a driving pulley 62 fast thereto. Pulley 62 drives an endless belt 63 which is reeved around an idler pulley 64, a drive pulley 66 on the pulley shaft 37, whereby the upper endless conveyer 31 is driven and a drive pulley 67 on the pulley shaft 47, whereby the lower endless conveyer 32 is driven.

It may be noted that the drive pulleys 66 and 67 for the endless conveyers 31 are located at the discharge end of such conveyers, so as to maintain at all times tension on the conveying reaches 33 and 34 thereof. Such is eminently desirable as contarsted to having the driving pulleys located at the bale receiving ends thereof, which would tend to make the conveying reaches run at slack instead of under tension. The disclosed arrangement reduces wear.

It may be noted also that the slack take-up pulley 64 is located in such a position as to maintain good tension in the endless belt 63 at those portions where there is driving effort on the drive pulleys 66 and 67 for the conveyers 31 and 32.

It will be noted that the upper and lower endless conveyers 31 and 32 extend in such a fashion that the conveying reaches thereof are convergent in a discharge direction, and it will be noted that the movement of the bale by the conveying reaches 33 and 34 will tend to swing the upper endless conveyer 31 in a clockwise direction as seen in FIGURE 2, and in a counter-clockwise direction as seen in FIGURE 3.

During such movement of the upper endless conveyer 31 with respect to the lower endless conveyer 33, the slack take-up pulley 64 must move in correlative directions to take up any slack in the endless driving strand 63. Accordingly, the slack take-up pulley is mounted on an arm 69 fixed to a rock shaft 71 mounted in bracketline extension 72 and 73 from the spaced conveyer frames 39. The opposite end of the rock shaft 71 has an arm 74 fastened thereon. The arm 74 is attached to a tension spring 76 which in turn, is connected at its other end to a rod 77 which passes through an ear extending from a bracket 79 fastened on the top flange of the conveyer frame 39. The tension in the spring 76 can be adjusted by nuts 81 threaded on to the rod 77.

Structure is provided for biasing the upper conveyer 31, at all times in a direction towards the lower conveyer 32, so as to provide good contact of the conveying reaches with the moving bale, and to this end the upper conveyer 31 has a cover plate 82 secured in any convenient fashion to the upper flanges of the conveyer side frames 39. One end of the cover plate 82 has a strap 83 held thereto by means of bolts 84, and each end of the strap 83 has an aperture 86 therein. Extending through each aperture 86 is an upper conveyer positioning rod 87 which have pivoted connections at 89 to brackets 91 extending upwardly from the upper chord members 13. Downward movement of the upper conveyer 31 in a direction towards the lower conveyer 32 is limited by stop collars 88 secured to the rods 87. The upper end of the rod 87 has a stop collar 92 secured thereto, and an expansion spring 93 is constrained between the stop collar 92 and the strap 83, the spring being compressed when a bale is moved between the upper and lower conveyers 31 and 32.

It will be seen from the foregoing description that the passage of a bale between the opposed conveying reaches of the upper and lower conveyers 31 and 32 will cause the springs 93 to be compressed, urging the two conveying reaches into firm contact with the bale to accelerate the same to a throwing velocity. As the bale enters the receiving end of the conveyers, the movement of the upper endless conveyer with respect to the lower endless conveyer causes the slack take-up pulley 64 to move to positions where at all times the slack is properly taken up in the endless driving strand 63.

In addition to the means for pivotally carrying the thrower from a support, such as a baler, the frame includes means affording power transmission from means on the support to the bale thrower regardless of the pivotal movement of the frame relative to the support. More specifically, in the disclosed construction, power is supplied to a power shaft 101 to drive the conveyers 31 and 32 regardless of the pivotal movement of the bale thrower relative to the baler by means including a universal coupling 103 which is located in vertical alignment with the bolts 58 and 58a and which includes driving and driven elements respectively connected to the power shaft 101 on the bale thrower and a power delivering shaft 59 supported by the baler. The power shaft 101 is connected to the speed reducer unit 56. The shaft 59 can receive power either through a power take-off from a tractor or by an engine carried by the baler. While the disclosed construction utilizes a common universal coupling to permit power transmission between two relatively fixed rotable shafts regardless of pivotal movement between the baler and the bale thrower, other mechanisms, such as gearing, can also be employed.

Various of the features of the invention are set forth in the following claims.

What is claimed is:

1. A bale throwing mechanism comprising a frame, a pair of endless belt conveyors supported by said frame in opposing relation to each other and for movement of the discharge ends thereof relative to each other, each of said conveyors including at the discharge end thereof drive means, and means on said frame connected to said drive means for powering said conveyors.

2. A bale throwing mechanism comprising a frame, a pair of endless belt conveyors mounted on said frame in vertically opposing relation to each other and for movement of the discharge ends thereof relative to each other, each of said conveyors including at the discharge end thereof a drive pulley and means on said frame connected to said drive pulleys for powering said conveyors and including a drive belt and means for removing slack in said drive belt occurring consequent to relative movement of the discharge ends of said conveyor.

3. A bale throwing mechanism comprising a frame, a pair of endless belt conveyers supported by said frame in vertically opposed relation to each other, each of said conveyers including, at the discharge end thereof, a drive pulley, means on said frame connected to said drive pulley for powering said conveyers, said means for powering said conveyers including a driveshaft, means on said frame for connecting said frame to a support for pivotal movement of the frame relative to the support about a vertical axis, and a universal coupling connected to said driveshaft and adapted to be connected to a power shaft on the support for transmission of power notwithstanding pivotal movement of said frame relative to the support, said coupling being vertically aligned with said means connecting said frame to the support.

4. In a bale throwing mechanism, a pair of endless conveyers each having conveying and return reaches, said conveyers being located to receive a bale between opposed conveying reaches and to accelerate said bale to a throwing velocity at the discharge end of said conveyers, one of said endless conveyers being relatively fixed in position and including a frame supporting spaced pulleys between which the conveying and return reaches thereof are reeved, and a driving pulley for the one of said spaced pulleys mounted on the discharge end of said conveyer, the second of said conveyers being relatively movable with respect to the said one conveyer and including frame means supporting further spaced pulleys between which the conveying and return reaches of said second conveyer are reeved, and a further driving pulley for the one of said further spaced pulleys disposed at the discharge end of said second conveyer, driving means for both of said conveyers including a power delivering pulley, an endless strand trained around said first and second named driving pulleys and around said power delivering pulley, a slack take-up pulley mounted on said second conveyer frame means and disposed between said power delivering pulley and said first named drive pulley and defining with said power delivering pulley a bight in said endless strand adapted to lengthen and contract in accordance with the relative movement of said first and second endless conveyers in response to passage of a bale between said opposed conveying reaches, spring means for moving said slack take-up pulley in a direction to maintain tension on said endless strand, and means resiliently urging said conveyers in bale gripping directions.

5. In a bale throwing mechanism, a pair of endless belt conveyers having conveying and return reaches adapted to receive a moving bale between opposed conveying reaches of said conveyers and accelerate said bale to a throwing velocity at the discharge end of said endless conveyers, one of said endless conveyers including a frame supporting spaced pulleys between which the conveying and return reaches thereof are reeved, a driving pulley for one of said spaced pulleys mounted at the discharge end of said conveyer, the second of said conveyers including frame means supporting further spaced pulleys between which the conveying and return reaches of said second conveyer are reeved, a further driving pulley for the pulley disposed at the discharge end of said second conveyer, driving means for both of said conveyers including at least one endless strand trained around said first and second named driving pulley and at said driving means, a slack take-up pulley mounted on said second conveyer frame means and disposed between said driving means and said first named drive pulley and defining with said driving means a bight in said endless strand adapted to lengthen and contract, and spring means for moving said slack take-up pulley in a direction to maintain tension on said endless strand.

6. In a bale throwing mechanism, a pair of endless belt conveyers having conveying and return reaches adapted to receive a moving bale between opposed conveying reaches of said conveyers and accelerate said bale to a throwing velocity at the discharge end of said endless conveyers, one of said endless conveyers being relatively fixed in position and including a frame supporting spaced pulleys between which the conveying and return reaches thereof are reeved, a driving pulley for one of said spaced pulleys mounted on the discharge end of said conveyer, the second of said conveyers being relatively movable with respect to the said one conveyer and including frame means supporting further spaced pulleys between which the conveying and return reaches of said second conveyer are reeved, a further driving pulley for the pulley disposed at the discharge end of said second conveyer, driving means for both of said conveyers including at least one endless strand trained around said first and second named driving pulley and at said driving means, a slack take-up pulley mounted on said second conveyer frame means and disposed between said driving means and said first named drive pulley and defining with said driving means a bight in said endless strand adapted to lengthen and contract in accordance with the movement of said first endless conveyer toward and away from said second endless conveyer, according to the passage of a bale between the opposed conveying reaches of both of said conveyers, and means resiliently urging said conveyers in bale gripping directions.

7. In a bale throwing mechanism, a pair of endless belt conveyers having conveying and return reaches adapted to receive a moving bale between opposed conveying reaches of said conveyers and accelerate said bale to a throwing velocity at the discharge end of said endless conveyers, one of said endless conveyers being relatively fixed in position and including a frame supporting spaced pulleys between which the conveying and return reaches thereof are reeved, a driving pulley for one of said spaced pulleys mounted at the discharge end of said conveyer, the second of said conveyers being relatively movable with respect to the said one conveyer and including frame means supporting further spaced pulleys between which the conveying and return reaches of said second conveyer are reeved, a further driving pulley for the pulley disposed at the discharge end of said second conveyer, driving means for both of said conveyers including at least one endless strand trained around said first and second named driving pulley and at said driving means, a slack take-up pulley mounted on said second conveyer frame means and disposed between said driving means and said first named drive pulley and defining with said driving means a bight in said endless strand adapted to lengthen and contract in accordance with the movement of said first endless conveyer toward and away from said second endless conveyer, according to the passage of a bale between the opposed conveying reaches of both of said conveyers.

References Cited by the Examiner

UNITED STATES PATENTS

| | | | |
|---|---|---|---|
| 3,043,418 | 7/1962 | Morrison et al. | 198—128 |
| 3,095,961 | 7/1963 | Hollyday | 198—128 |
| 3,095,962 | 7/1963 | Hollyday | 198—128 |
| 3,126,083 | 3/1964 | Hollyday | 198—203 X |
| 3,132,736 | 5/1964 | May et al. | 198—128 X |
| 3,155,223 | 11/1964 | De Buhr | 198—128 |
| 3,198,106 | 8/1965 | Skromme | 198—128 X |

EVON C. BLUNK, *Primary Examiner.*

R. J. HICKEY, *Assistant Examiner.*